US009806424B2

(12) United States Patent
Yonezawa

(10) Patent No.: US 9,806,424 B2
(45) Date of Patent: Oct. 31, 2017

(54) PRESSURE-RESISTANT EXPLOSION-PROOF CONTAINER HAVING A SLIT WAVEGUIDE

(75) Inventor: Masaaki Yonezawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 263 days.

(21) Appl. No.: 13/991,526

(22) PCT Filed: Dec. 14, 2011

(86) PCT No.: PCT/JP2011/078942
§ 371 (c)(1), (2), (4) Date: Jun. 4, 2013

(87) PCT Pub. No.: WO2012/081633
PCT Pub. Date: Jun. 21, 2012

(65) Prior Publication Data

US 2013/0278469 A1 Oct. 24, 2013

(30) Foreign Application Priority Data

Dec. 15, 2010 (JP) ................................ 2010-279098

(51) Int. Cl.
*H01Q 13/18* (2006.01)
*H01Q 1/00* (2006.01)
(Continued)

(52) U.S. Cl.
CPC ............ *H01Q 13/18* (2013.01); *H01Q 1/002* (2013.01); *H01Q 1/42* (2013.01); *H01Q 13/10* (2013.01)

(58) Field of Classification Search
CPC .......... H01Q 13/18; H01Q 13/10; H01Q 1/42; H01Q 1/002; G06K 7/10178; G06K 19/07749
(Continued)

(56) References Cited

U.S. PATENT DOCUMENTS 3,478,188 A * 11/1969 White ...................... H05B 6/78 219/696
4,242,685 A * 12/1980 Sanford ................ H01Q 13/18 343/700 MS (Continued)

FOREIGN PATENT DOCUMENTS

CN 101800356 A 8/2010
DE EP 0599316 B1 * 6/1994

(Continued)

OTHER PUBLICATIONS

Paul Hills, "Radio", vol. 5 No. 16 Jan. 10, 2006.*

(Continued)

*Primary Examiner* — Jessica Han
*Assistant Examiner* — Bamidele A Jegede
(74) *Attorney, Agent, or Firm* — Sughrue Mion, PLLC

(57) ABSTRACT

To provide a pressure-resistant explosion-proof container in which a wireless circuit housed inside the pressure-resistant explosion-proof container can transmit and receive a high frequency signal, without installing an antenna outside.

A pressure-resistant explosion-proof container includes a container made of metal, a slit functioning as an explosion-proof clearance that is formed by penetrating a wall surface of the container, and a cavity resonator that is provided in the container and in which an antenna is built that transmits and receives a high frequency signal by using the slit as a waveguide.

9 Claims, 9 Drawing Sheets

(51) Int. Cl.
*H01Q 1/42* (2006.01)
*H01Q 13/10* (2006.01)

(58) Field of Classification Search
USPC .................................. 343/702, 846; 361/118
See application file for complete search history.

(56) References Cited

U.S. PATENT DOCUMENTS 5,422,611 A * 6/1995 Kashima ................. H01P 5/107 333/137
5,489,913 A * 2/1996 Raguenet ........... H01Q 21/0081 343/767
5,717,410 A 2/1998 Ohmine et al.
6,229,448 B1 * 5/2001 Bennett, Jr. .......... B67D 7/3209 340/618
6,249,244 B1 * 6/2001 Heidecke .............. G01F 23/284 342/124
7,057,577 B1 * 6/2006 Willoughby ............. H01Q 1/50 343/872
2003/0214774 A1 * 11/2003 Locatelli .......... G06K 19/07749 361/118
2003/0232595 A1 * 12/2003 Baker ................ H04B 7/15535 455/11.1
2005/0017914 A1 1/2005 Huang
2005/0146475 A1 7/2005 Bettner et al.
2005/0280480 A1 * 12/2005 Nakabayashi .......... H01P 5/107 333/26
2007/0013594 A1 * 1/2007 Yegin ................... H01Q 1/3275 343/713
2007/0017986 A1 1/2007 Carrender et al.
2007/0262868 A1 * 11/2007 Westrick .......... G06K 19/07749 340/572.7
2008/0191961 A1 * 8/2008 Tuttle ..................... H01Q 21/00 343/893
2011/0006953 A1 * 1/2011 Chiang ................. G06F 1/1616 343/702
2011/0063181 A1 * 3/2011 Walker ..................... H01Q 9/16 343/803
2011/0316757 A1 * 12/2011 Yonezawa et al. ........... 343/846

FOREIGN PATENT DOCUMENTS

JP 10-172648 A 6/1998
JP 2000-4533 A 1/2000
JP 2001-156534 A 6/2001
JP 2001-177332 A 6/2001
JP 2008-78835 A 4/2008
JP 2010-136062 A 6/2010

OTHER PUBLICATIONS

Cerri et al. “Field Penetration into Metallic Enclosures Through Slots Excited by ESD”, IEEE Transactions on Electromagnetic Compatibility, vol. 36, No. 2, May 1994.*
Extended European Search Report dated Oct. 17, 2014 issued by European Patent Office in counterpart European Application No. 11849617.3.
International Search Report dated Mar. 19, 2012 issued in International Application No. PCT/JP2011/078942 (PCT/ISA/210).
Written Opinion dated Mar. 19, 2012 issued in International Application No. PCT/JP2011/078942 (PCT/ISA/237).

* cited by examiner

PRESSURE-RESISTANT EXPLOSION-PROOF CONTAINER HAVING A SLIT WAVEGUIDE

TECHNICAL FIELD

The present invention relates to a pressure-resistant explosion-proof container, and particularly, to a pressure-resistant explosion-proof container preferably used in a high frequency wireless apparatus.

BACKGROUND ART

In various factories and plants, for the purpose of information exchange and an emergency call between an administration department and a field, for example, a high frequency wireless communication system in a high frequency band of 1.9 GHz has been used.

FIG. 5 shows an example of such a high frequency wireless communication system. The high frequency wireless communication system includes plural fixed wireless devices (wireless base stations) 3*a* and 3*b* connected to a private branch exchange 1 by communication lines 2*a* and 2*b*. In addition, in the high frequency wireless communication system, through the fixed wireless devices 3*a* and 3*b* and antennas 4*a* and 4*b*, wireless communication is performed between plural mobile terminals 5*a*, 5*b* and . . . in an area and the private branch exchange 1. That is, when such a high frequency wireless communication system is used, through the fixed wireless device 3*a* and 3*b*, a phone call can be made between another telephone 6 connected to the private branch exchange 1 and the mobile terminals 5*a* and 5*b* in the field, and an emergency notification can be concurrently transmitted to each mobile terminal 5*a* to 5*f* from the administration department through each fixed wireless device 3*a* and 3*b*.

However, when the above-mentioned high frequency wireless communication system is introduced into an oil plant and a gas fuel power plant handling volatile gas, each fixed wireless device 3*a* and 3*b* provided in an explosion-proof region is demanded to have an explosion-proof structure to prevent an explosion accident before happens.

FIG. 6 is a view showing a pressure-resistant explosion-proof container of the related art which is formed to have a pressure-resistant explosion-proof structure. In FIG. 6, an antenna attachment hole 21 is provided on a peripheral surface of an explosion-proof device main body 22.

A 45° elbow-type joint 23 is attached at one end to the antenna attachment hole 21 through an O ring 23*a* while satisfying the pressure-resistant explosion-proof structure conditions of a joint surface.

That is, the 45° elbow-type joint 23 is screwed into the explosion-proof device main body 22, and a screw specification is a structure having pressure-resistant explosion-proof performance.

In the 45° elbow-type joint 23, an antenna position fixing lock nut 23*b* is attached to the antenna attachment hole 21.

By loosening the antenna position fixing lock nut 23*b* to rotate the 45° elbow-type joint 23, the explosion-proof device main body 22 can be installed such that the antenna direction is aligned to a polarization plane even when the installation position of the explosion-proof device main body 22, for example, the explosion-proof device main body 22 is changed from a horizontal position to a vertical position.

The horizontal position, vertical position and polarization plane of the antenna can be aligned by rotating the antenna by 180 degrees.

An antenna cover 24 is attached at one end to the other end of the 45° elbow-type joint 23 through an O ring 24*a* while satisfying the pressure-resistant explosion-proof structure conditions of the joint surface, and has an antenna 25 therein while satisfying the strength conditions of the pressure-resistant explosion-proof structure.

That is, the antenna has a minute gap and a sufficient length of fit between the antenna cover 24 and the 45° elbow-type joint 23, and has a structure satisfying the pressure-resistant explosion-proof standard.

The antenna cover 24 and the 45° elbow-type joint 23 are fixed by an antenna cover fixing lock nut 24*b*.

In the configuration of FIG. 6, a circuit and a high frequency connector that is an antenna connection unit have a structure that resists pressure, and a metal container and the connector have a pressure-resistant explosion-proof structure as a whole.

Then, a transmission high frequency signal is transmitted from the antenna through a connector unit as a high frequency signal, and a reception high frequency signal received by the antenna is transmitted to the circuit (not shown) through the connector unit.

FIGS. 7A and 7B are cross-sectional views showing other examples of the related art.

In FIG. 7A, an antenna 41 is disposed in a pressure-resistant explosion-proof container 40 formed of a robust metal. A part of the pressure-resistant explosion-proof container 40 is sealed by a glass window (or resin or like) 42 though which a high frequency signal passes. The antenna 41 is disposed around the glass window 42, and transmits and receives the high frequency signal through the glass window 42.

Since the high frequency signal does not pass through metal, a part of the container is necessary to be formed of glass or resin to install the antenna inside the container. In addition, in order to effectively receive and transmit the high frequency signal, it is necessary to increase the size of the window portion. That is, the high frequency signal is remarkably attenuated in an opening which is equal to or less than a specific size determined by a wavelength.

FIG. 7B is a view showing an example in which a glass window (or resin or the like) 42*a* is formed in a dome shape to widen antenna directivity.

CITATION LIST

Patent Literature

[PTL 1] JP-A-H10-172648
[PTL 2] JP-A-2008-78835
[PTL 3] JP-A-2010-136062

SUMMARY OF INVENTION

Problem to be Solved by Invention

However, in the example of the related art shown in FIG. 6, the structure is complicated and costs are increased in order to allow the high frequency connector to resist pressure.

In addition, since a mechanically strong material does not correspond to a material having good high frequency properties all the time, the connector in which a structure to resist pressure is realized has a possibility of deteriorating high frequency properties.

In addition, when the lightning strikes near the antenna, there is a possibility that a large amount of electromagnetic energy thereof reaches the circuit through the antenna.

Moreover, in order to install the antenna outside the container so that the antenna directivity and transmission and reception performance are not deteriorated, a mechanism to allow passage of a high frequency signal is necessary to be provided in a part of the container.

For the passage of the high frequency, generally, a coaxial structure in which an insulator is provided between a central conductor and a peripheral conductor is provided (even when the coaxial structure is not provided, an insulator is necessary between conductors).

As the insulator, resin which has good high frequency properties is often used. However, the resin does not necessarily have robustness required for the pressure-resistant explosion-proof container.

There also is a method in which a coaxial cable is passed by providing a hole in a container particularly without providing a connector, and a gap between the cable and the container is sealed by resin and the like. However, the resin constituting the coaxial cable does not necessarily have robustness required for the pressure-resistant explosion-proof container.

In addition, in the structures shown in FIGS. 7A and 7B, glass, resin and the like are used as a window material for the passage of a high frequency signal through a part of the pressure-resistant explosion-proof container 40. In order to effectively transmit and receive the high frequency signal, it is necessary to increase the size of the window portion. However, the high frequency signal is remarkably attenuated in the opening which is equal to or less than a specific size determined by a wavelength.

Since glass, resin and the like have low strength in comparison with metal, there is a high risk of breakage. In particular, resin and the like are easily deteriorated by a temperature change and environmental conditions in a field such as ultraviolet rays, and have a problem in strength as an explosion-proof container.

In addition, in order to widen antenna directivity, while an antenna is necessary to be provided inside domelike glass and resin, a mechanism is complicated and costs are increased for connection of the glass and resin to the metal and when an adhesive and the like are used, there is a concern of deteriorating the adhesive according to the environmental conditions.

Accordingly, an object of the present invention is to provide a pressure-resistant explosion-proof container in which a slit is provided in a container made of metal and a wireless circuit housed inside the pressure-resistant explosion-proof container can transmit and receive a high frequency signal, without installing an antenna outside.

Means for Solving Problem

The object of the present invention is achieved by the following configuration:

(1) A pressure-resistant explosion-proof container comprising:

a container made of metal;

a slit functioning as an explosion-proof clearance that is formed by penetrating a wall surface of the container; and a cavity resonator that is provided in the container and in which an antenna is built that transmits and receives a high frequency signal by using the slit as a waveguide.

(2) In the pressure-resistant explosion-proof container according to the configuration in (1), the container has a rectangular parallelepiped or cubic shape, and the slit is formed horizontally, vertically, or in a cross shape on at least one surface of the container.

(3) In the pressure-resistant explosion-proof container according to the configuration in (1) or (2), when the cavity resonator that is built in the container is set as a first cavity resonator, and an antenna that is built in the first cavity resonator is set as a first antenna, a second cavity resonator in which a second antenna is built is provided on an outer wall surface of the container to be opposed to the first cavity resonator, and a third antenna is provided in an outer space of the second cavity resonator, and the second antenna and the third antenna are connected by a high frequency cable.

Advantageous Effects of Invention

As apparent from the above description, according to the configuration in (1), since the pressure-resistant explosion-proof container includes the container made of metal, the slit functioning as an explosion-proof clearance that is formed by penetrating the wall surface of the container, and the cavity resonator that is provided in the container and in which an antenna is built that transmits and receives a high frequency signal by using the slit as a waveguide, the pressure-resistant explosion-proof container in which a wireless circuit disposed in the container can transmit and receive the high frequency signal can be realized, and the material which has deteriorated high frequency properties is not used for the path of the high frequency signal to prevent deterioration in circuit performance.

In addition, since the container is made of metal only, a risk of breakage can be decreased and deterioration in the material of the container due to environmental conditions in the field can be avoided.

Furthermore, without installing the antenna outside the container, the electromagnetic energy by lightning can be prevented from reaching the circuit.

According to the configuration in (2), since the container has a rectangular parallelepiped or cubic shape and the slit is formed horizontally, vertically, or in a cross shape on at least one surface of the container, the container is formed to have a simple structure, and thus, costs can be reduced.

According to the configuration in (3), when the cavity resonator that is built in the container is set as the first cavity resonator, and the antenna that is built in the first cavity resonator is set as the first antenna, since the second cavity resonator in which the second antenna is built is provided on the outer wall surface of the container to be opposed to the first cavity resonator and the third antenna is provided in the outer space of the second cavity resonator, and the second antenna and the third antenna are connected by the high frequency cable, a high frequency emission source is a tip end of the antenna and hence, there is no limitation to an installation place of the container.

In addition, a conductor to connect the circuit with the antenna installed in the space is not present. Therefore, even when the electromagnetic energy by lightning reaches the antenna, a probability that the energy reaches the circuit inside the container can be decreased.

DESCRIPTION OF EMBODIMENTS

Figure 1A:
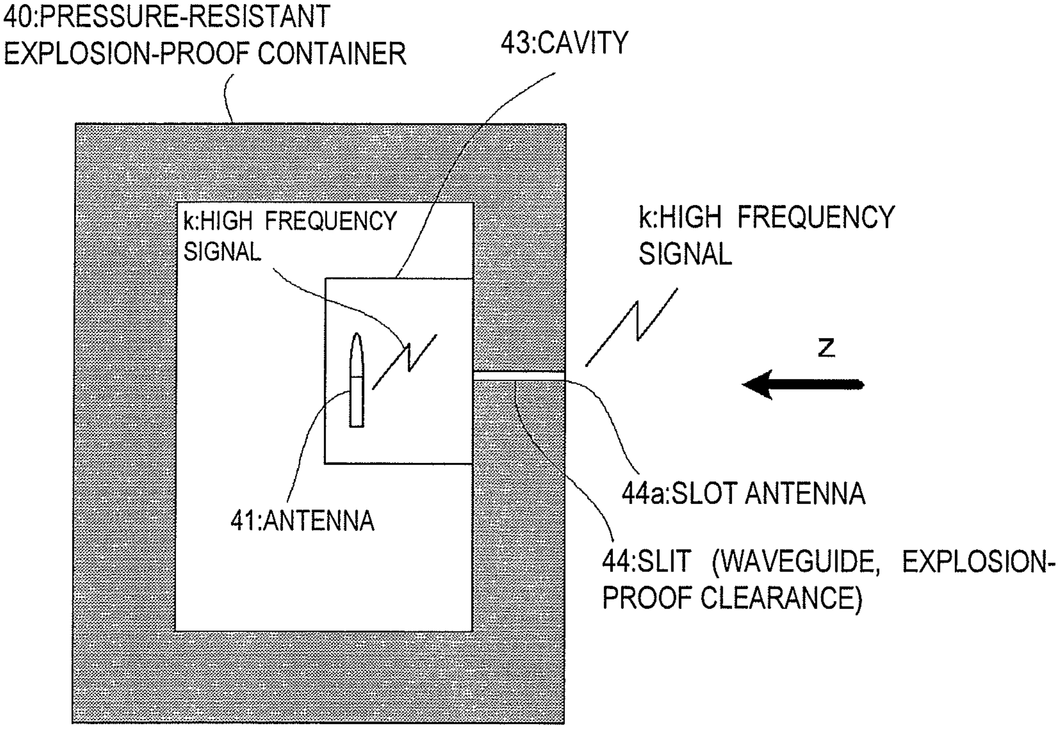
FIG. 1A is a cross-sectional view of a pressure-resistant explosion-proof container of the present invention.
Figure 1B:
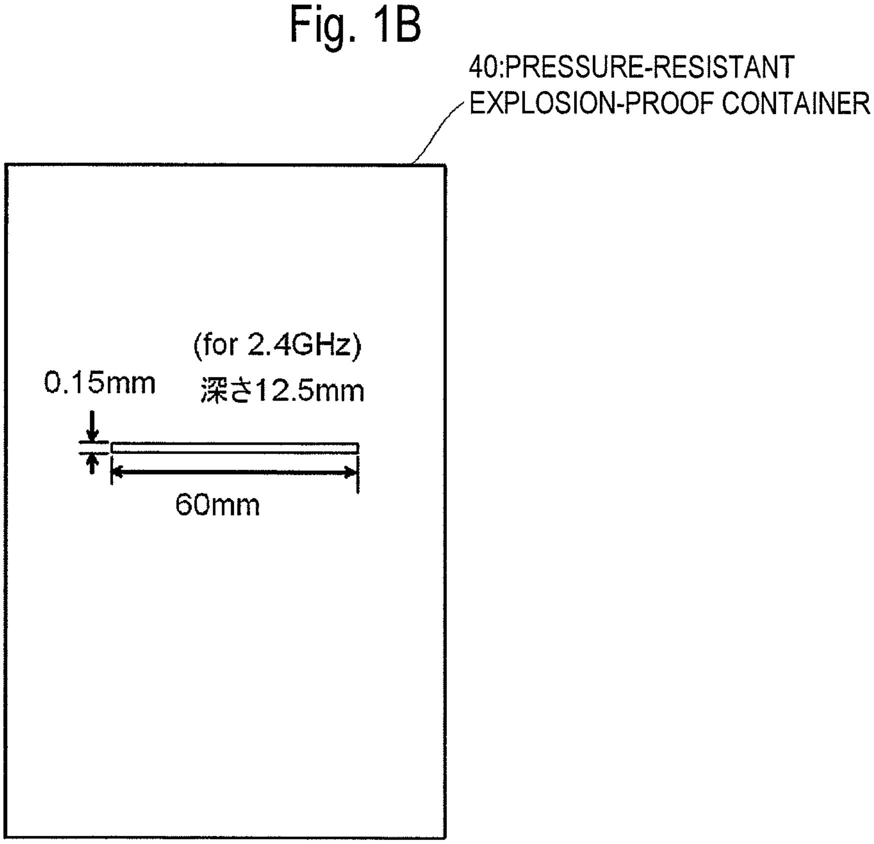
FIG. 1B is a view of FIG. 1A as seen from a Z direction.
Figure 1C:
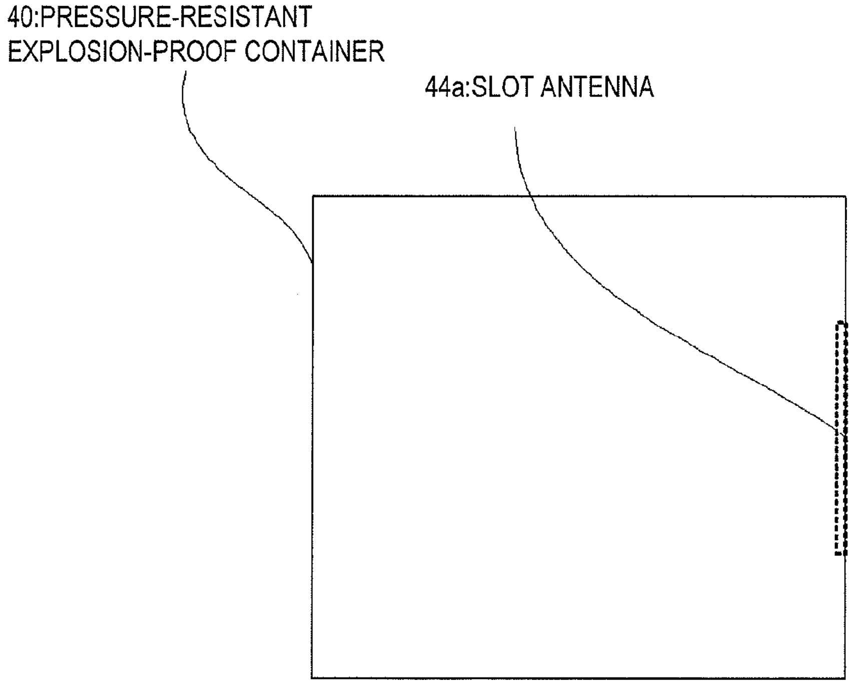
FIG. 1C is a plan view of FIG. 1A.

FIG. 1A is a cross-sectional view of a pressure-resistant explosion-proof container of the present invention. FIG. 1B is a view of FIG. 1A as seen from a Z direction. FIG. 1C is a plan view of FIG. 1A.

In these drawings, a pressure-resistant explosion-proof container 40 is a container made of a metal having a rectangular parallelepiped or cubic shape and a slit 44 penetrating the inner surface of the container is formed in one surface of side surfaces. As shown in FIG. 1B, for example, the silt is made to have a width of 0.15 mm and a length of 60 mm when a high frequency signal k to be transmitted and received is 2.4 GHz. In addition, the thickness of the pressure-resistant explosion-proof container 40 is approximately 12.5 mm, which is sufficient for a pressure-resistant explosion-proof container. The thickness is designed to function as a pressure-resistant explosion-proof container depending on the size of the container.

Moreover, the slit 44 functions as an explosion-proof clearance and a waveguide. An outer wall side of the slit functions as a slot antenna 44*a* as shown in FIG. 1C.

Furthermore, a cavity 43 functions as a cavity resonator so as to resonate the high frequency signal k which is transmitted and received. As shown in FIG. 1A, the cavity 43 is fixed by welding and adhesion on one surface of the inner walls of the pressure-resistant explosion-proof container 40 so as to cover the slit 44. The cavity 43 has a rectangular parallelepiped shape in which one surface on the side of the slit 44 is opened at least to receive the high frequency signal from the slit 44. The size of the cavity 43 is determined by the resonance magnitude of the high frequency signal which is transmitted and received. As for materials, for example, the cavity 43 is made of metals such as Fe, Cu and Al, and any material which reflects the high frequency signal may be used even when the material is not metal.

The reference number 41 shown in FIG. 1A is an antenna disposed in the cavity 43, and the antenna transmits and receives the high frequency signal k which is resonated in the cavity 43 to and from a wireless transmitting and receiving circuit (not shown) disposed in the pressure-resistant explosion-proof container 40, for example, through a coaxial cable (high frequency cable) (not shown).

In the above-described configuration, during the transmitting operation, the transmitting circuit generates a high frequency signal. The generated high frequency signal is emitted to the inside of the cavity 43 through the antenna 41. The high frequency signal k which is resonated in the cavity is guided to the slot antenna 44*a* through the slit functioning as a waveguide and an explosion-proof clearance, and the high frequency signal is emitted to an outer space from the slot antenna 44*a* as a high frequency signal k.

Furthermore, during the receiving operation, the high frequency signal k arrived from the outside is received by the slot antenna 44*a*, and guided to the inside of the cavity 43 through the waveguide formed with the slit to be emitted in the cavity 43. The high frequency signal k which is resonated in the cavity is received by the receiving circuit (not shown) through the antenna 41. In addition, since the pressure-resistant explosion-proof container 40 in FIGS. 1A to 1C is horizontally fixed and the slit is formed in a horizontal direction, a horizontal polarization high frequency signal can be transmitted and received.

According to the above-described configuration, since the pressure-resistant explosion-proof container is made of metal, and the wireless circuit housed in the container can transmit and receive the high frequency signal, without installing the antenna outside, a risk of breakage can be decreased. Moreover, deterioration in the material of the container by environmental conditions in the field can be avoided. Furthermore, since the container can be formed to have a simple structure, costs can be reduced.

In addition, since the material which has deteriorated high frequency properties is not used for the path of the high frequency signal, deterioration in circuit performance can be prevented. Furthermore, since the antenna is not exposed to the outside of the container, the electromagnetic energy by lightning can be prevented from reaching the circuit.

Figure 2A:
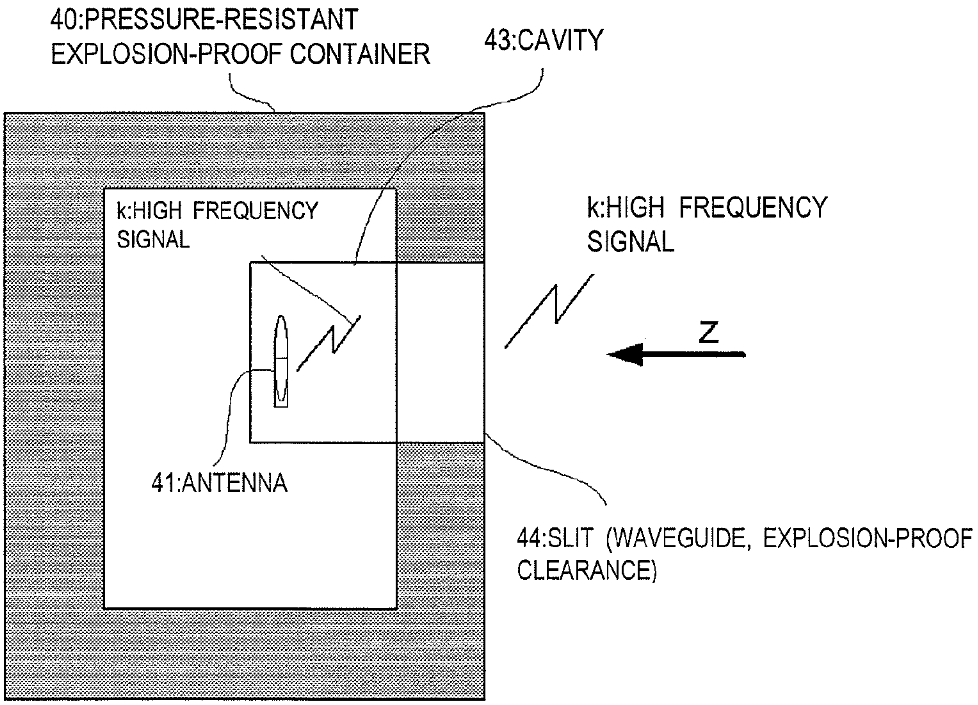
FIG. 2A is a cross-sectional view showing another embodiment of the present invention.
Figure 2B:
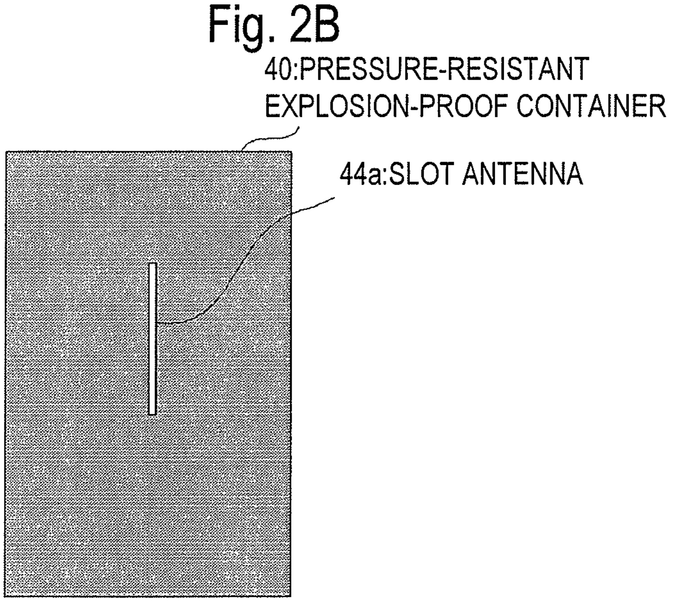
FIG. 2B is a view of FIG. 2A as seen from a Z direction.
Figure 2C:
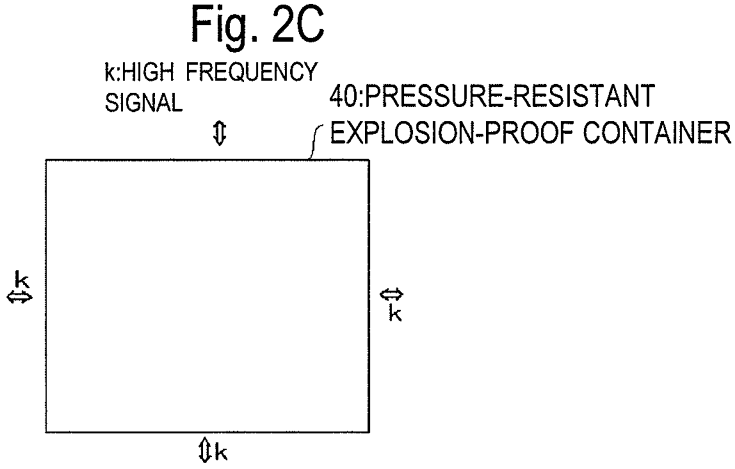
FIG. 2C is a plan view showing a transmission and reception state of a high frequency signal when a slit is provided on respective opposed surfaces of wall surfaces of the pressure-resistant explosion-proof container in FIG. 2A.
Figure 2D:
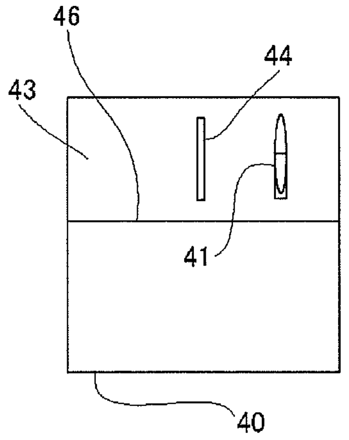
FIG. 2D is a view showing a state in which a part of the pressure-resistant explosion-proof container in FIG. 2A is a cavity.
Figure 2E:
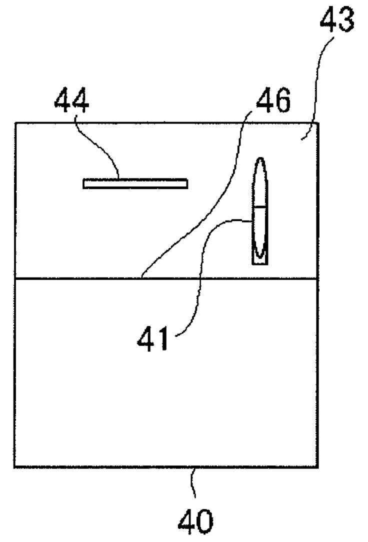
FIG. 2E is a view showing a state in which a part of the pressure-resistant explosion-proof container in FIG. 2A is a cavity.
Figure 2F:
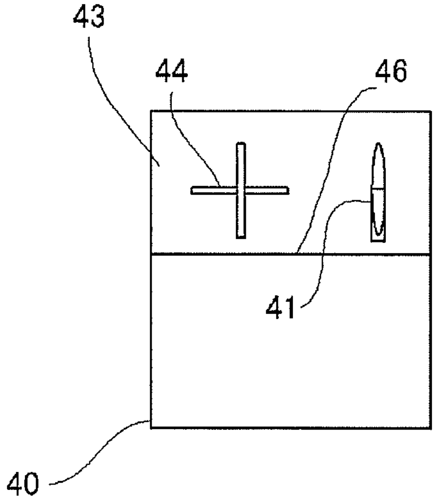
FIG. 2F is a view showing a state in which a part of the pressure-resistant explosion-proof container in FIG. 2A is a cavity.

FIG. 2A is a cross-sectional view showing another embodiment of the present invention. FIG. 2B is a view of FIG. 2A as seen from a Z direction. FIG. 2C is a plan view showing a transmission and reception state of a high frequency signal when a slit is provided on respective opposed surface of wall surfaces of the pressure-resistant explosion-proof container in FIG. 2A. FIGS. 2D, 2E and 2F are views showing a state in which a part of the pressure-resistant explosion-proof container is a cavity. In addition, the same reference numerals are used for the same components as in FIGS. 1A to 1C.

According to the embodiment in FIGS. 2A and 2B, since the slit is formed in a vertical direction in comparison with the embodiment in FIGS. 1A to 1C, a vertical polarization high frequency signal can be received. Moreover, as shown in FIG. 2C, when the slit is formed at 4 places of the respective opposed wall surfaces, the directivity of the high frequency signal can be improved. In this case, as shown in FIGS. 2D and 2E, a partition plate 46 may be provided to partition the inside of the pressure-resistant explosion-proof container 40 and form the cavity 43, and the slit may be formed on at least one wall surface of the cavity 43. In FIG.

2F, the slit is formed in a cross shape and can respond to the horizontal and vertical polarized high frequency signals.

However, in this case, since the high frequency signal is resonated, there is limitation to the size and the shape of the pressure-resistant explosion-proof container. As describe above, the high frequency signal which is resonated in the cavity is received by the receiving circuit (not shown) though the antenna.

Figure 3:
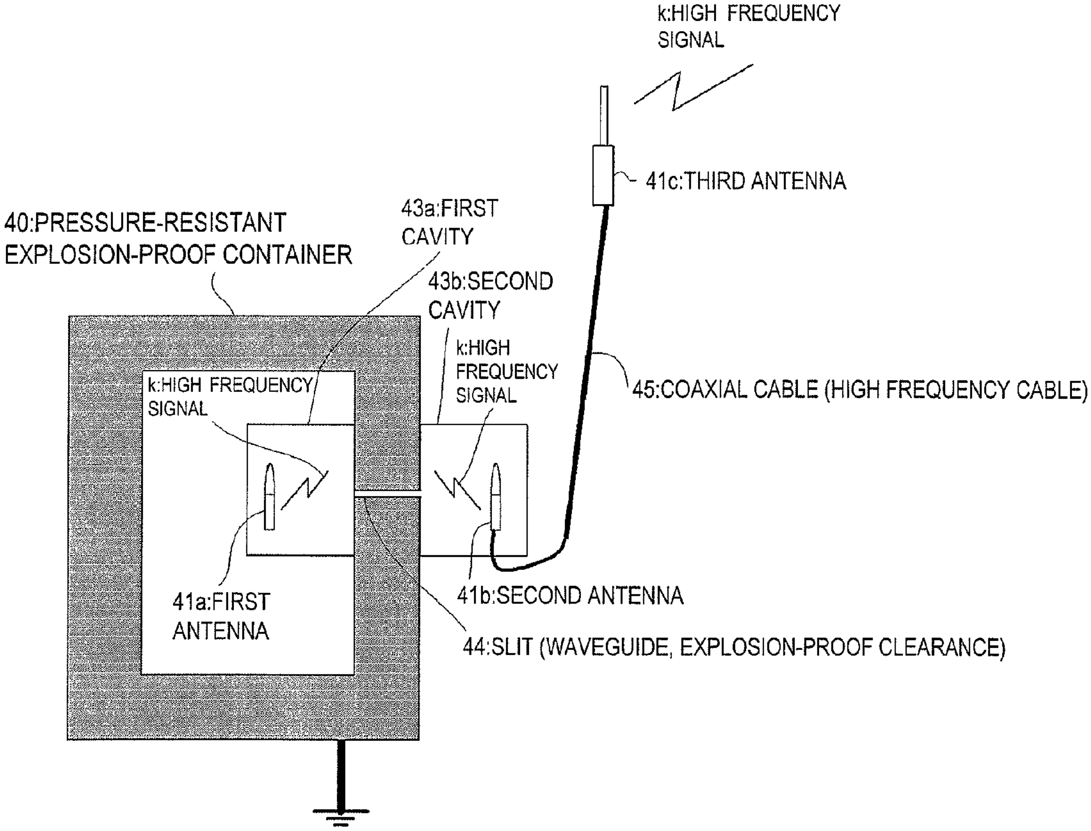
FIG. 3 is a cross-sectional view showing another embodiment of the present invention.

FIG. 3 is a view showing still another embodiment. In the embodiment in FIG. 3, a second cavity 43*b* in which a second antenna 41*b* is built is provided to be opposed to a first cavity 43*a* in the pressure-resistant explosion-proof container 40. The second cavity 43*b* is an equivalent cavity to the first cavity and attached to the outer wall surface of the pressure-resistant explosion-proof container 40 with the slit 44 interposed therebetween. Furthermore, a third antenna 41*c* is provided in the outer space of the second cavity 43*b*. Then, the second antenna 41*b* and the third antenna 41*c* are connected by the coaxial cable (high frequency cable) 45.

According to the embodiment in FIG. 3, since a transmission and reception source of the high frequency signal is the third antenna 41*c* provided at a tip end of the coaxial cable 45, there is no limitation to the installation place of the container.

Figure 4:
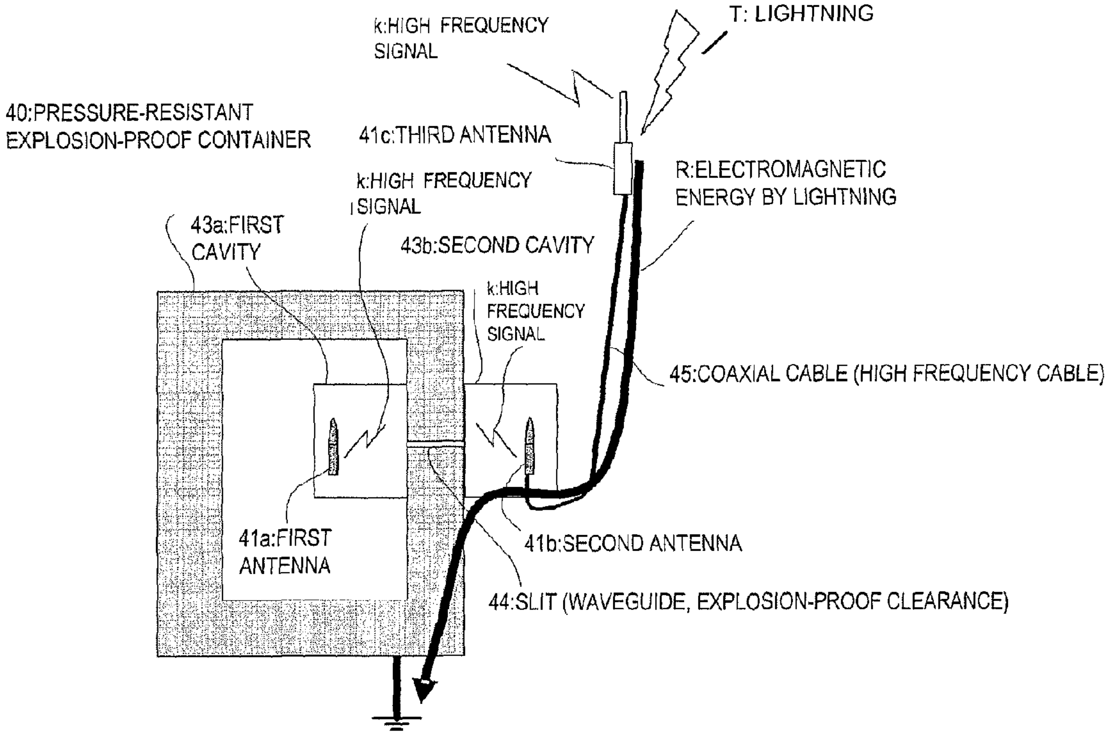
FIG. 4 is a view showing a flow of electromagnetic energy when the embodiment in FIG. 3 is struck by lightning.
Figure 5:
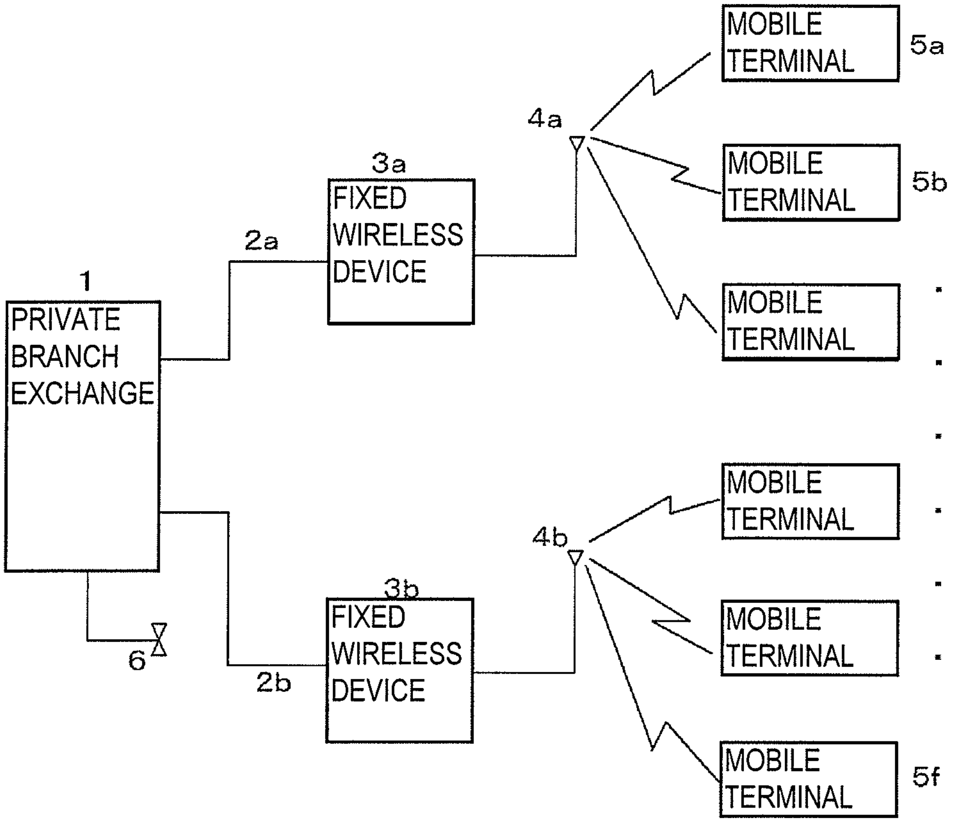
FIG. 5 is a block diagram showing an example of a high frequency wireless communication system to which the present invention is applied.
Figure 6:
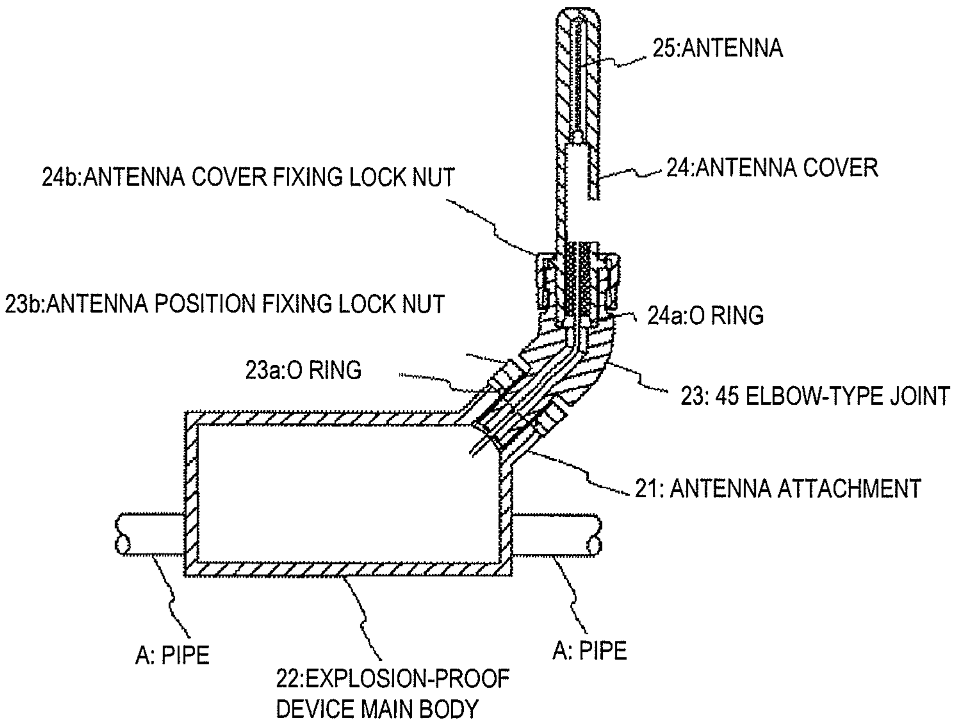
FIG. 6 is a cross-sectional view showing an example of a pressure-resistant explosion-proof container in the related art.
Figure 7A:
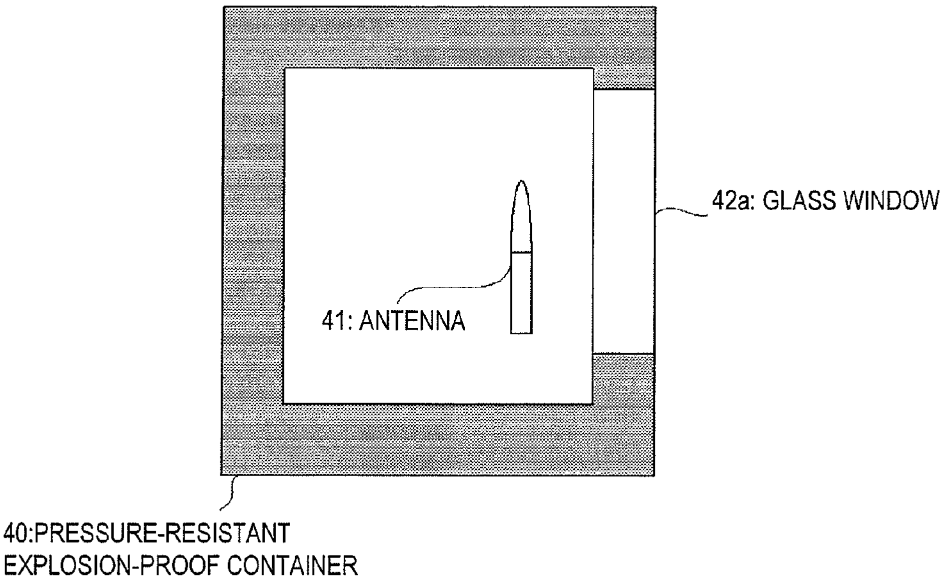
FIG. 7A is a view showing another embodiment of the pressure-resistant explosion-proof container in the related art.
Figure 7B:
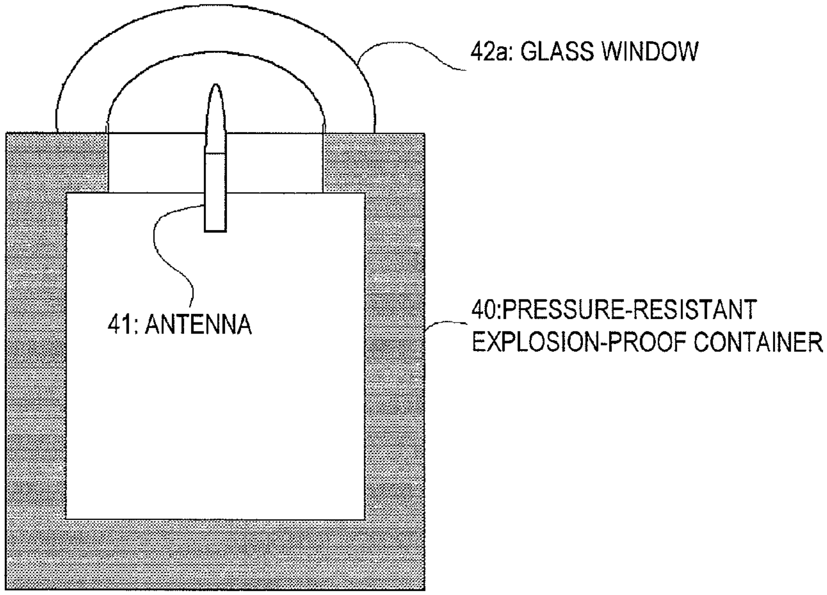
FIG. 7B is a view showing another embodiment of the pressure-resistant explosion-proof container in the related art.

FIG. 4 is a view showing a path of the electromagnetic energy (R) when the third antenna 41*c* shown in FIG. 3 is struck by lightning (T), and a conductor to connect the receiving circuit (not shown) disposed in the container with the third antenna 41*c* installed in the space is not present. Accordingly, even when the electromagnetic energy by the lightning (T) reaches the antenna, a probability that the energy reaches the circuit inside the container is very low.

In addition, in the above description, the specific and preferred embodiments are merely shown for the purpose of description and illustration of the present invention. Therefore, the present invention is not limited to the above-described embodiments and includes various changes and modifications without departing the scope of the invention.

The present application is based on Japanese Patent Application (Japanese Patent Application No. 2010-279098), filed Dec. 15, 2010, the content of which is incorporated herein by reference.

REFERENCE SIGNS LIST

1 PRIVATE BRANCH EXCHANGE
2 COMMUNICATION LINE
3 FIXED WIRELESS DEVICE
4, 25, 41 ANTENNA
5 MOBILE TERMINAL
21 ANTENNA ATTACHMENT HOLE
22 EXPLOSION-PROOF DEVICE MAIN BODY
23 ELBOW-TYPE JOINT
24 ANTENNA COVER
40 PRESSURE-RESISTANT EXPLOSION-PROOF CONTAINER
42 GLASS WINDOW
43 CAVITY (CAVITY RESONATOR)
44 SLIT
45 COAXIAL CABLE (HIGH FREQUENCY CABLE)

The invention claimed is:

1. A pressure-resistant explosion-proof container comprising:

a container made of metal;

a slit opening connecting an interior of the container and an outside of the container, functioning as an explosion-proof clearance; and a cavity resonator that is provided in the container and in which an antenna is configured to wirelessly transmit and receive a high frequency signal by using the slit opening as an open ended waveguide, the high frequency signal being transmitted to or received from the outside of the container, wherein when the cavity resonator that is built in the container is set as a first cavity resonator, and an antenna that is built in the first cavity resonator is set as a first antenna, a second cavity resonator in which a second antenna is built is provided on an outer wall surface of the container to be opposed to the first cavity resonator, and a third antenna is provided in an outer space of the second cavity resonator, and the second antenna and the third antenna are connected by a high frequency cable.

2. The pressure-resistant explosion-proof container according claim 1, wherein the container has a rectangular parallelepiped or cubic shape, and the slit opening is formed horizontally, vertically, or in a cross shape on at least one surface of the container.

3. The pressure-resistant explosion-proof container according to claim 2, wherein when the cavity resonator that is built in the container is set as a first cavity resonator, and an antenna that is built in the first cavity resonator is set as a first antenna, a second cavity resonator in which a second antenna is built is provided on an outer wall surface of the container to be opposed to the first cavity resonator, and a third antenna is provided in an outer space of the second cavity resonator, and the second antenna and the third antenna are connected by a high frequency cable.

4. The pressure-resistant explosion-proof container according claim 1, wherein the slit opening has a width of 0.15 mm and a length of 60 mm.

5. The pressure-resistant explosion-proof container according claim 1, wherein the cavity resonator comprises a material that reflects the high frequency signal.

6. The pressure-resistant explosion-proof container according claim 1, wherein the cavity resonator comprises a material of at least one of Fe, Cu, and Al.

7. The pressure-resistant explosion-proof container according claim 1, wherein the cavity resonator is configured to resonate the high frequency signal.

8. The pressure-resistant explosion-proof container according claim 1, wherein the open ended waveguide is configured to directly couple the high frequency signal to free space.

9. The pressure-resistant explosion-proof container according claim 1, wherein the cavity resonator is an enclosure formed by welding or adhesion to an inner surface of the container having the slit opening.

* * * * *